(12) United States Patent
Slany et al.

(10) Patent No.: US 7,112,650 B2
(45) Date of Patent: Sep. 26, 2006

(54) METHOD FOR THE PRODUCTION OF THERMOPLASTIC POLY(3-HYDROXYALKANOATES)

(75) Inventors: Michael Slany, Kirchheim (DE); Gerrit Luinstra, Mannheim (DE); Xavier Sava, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/484,170

(22) PCT Filed: Jul. 17, 2002

(86) PCT No.: PCT/EP02/07936

§ 371 (c)(1), (2), (4) Date: Jan. 20, 2004

(87) PCT Pub. No.: WO03/011941

PCT Pub. Date: Feb. 13, 2003

(65) Prior Publication Data

US 2004/0171760 A1    Sep. 2, 2004

(30) Foreign Application Priority Data

Jul. 31, 2001    (DE) ................. 101 37 046

(51) Int. Cl.
*C08G 67/00*    (2006.01)
(52) U.S. Cl. ............ 528/393; 528/403; 528/408; 528/409; 528/412; 528/421
(58) Field of Classification Search ......... 528/393, 528/403, 408, 409, 412, 421
See application file for complete search history.

(56) References Cited

U.S. PATENT DOCUMENTS 5,281,691 A    1/1994    Hubbs et al.

FOREIGN PATENT DOCUMENTS

| DE | 195 08627 | 9/1996 |
|---|---|---|
| EP | 577 206 | 1/1994 |
| GB | 1020575 | 2/1966 |
| WO | 94/00506 | 1/1994 |
| WO | 95/20616 | 8/1995 |

OTHER PUBLICATIONS

Yoshiharu Doi, Microbial Polyester, 1980, 1-14.
Yoshiharu Doi, Microbial Polyester, 1998, p. 21.
Yoshiharu Doi, Microbial Polyester, 1989, 107-133.
Seebach et al., Helvetica Chimica Acta, 1994,vol. 77, 1994, 1099-1123.
Breitschuh et al., Chimica 1990, vol. 44, 216-218.
Ohta et al., J.Chem.Soc., Chem.Commun.1992, 1725-1726.
Kircheldorf et al., Macromolecules 1994(27),3139-3146.
Hori et al., Macromolecules 1993(26), 5533-5534.
Zhang et al., Polymer Prep. (Am.Chem.Soc., Div. Polym. Chem), 1989, (30).
Zhang et al., Macromolecules 1990(23), 3206-3212.
Jedlinski et al., Macromolecules 1998, (31),6718-6720.
Gross et al., Macromolecules 1988(21), 2657-2668.
Lengweiler, Helvetica Chimica Acta 1996, vol. 79, pp. 670-701.

*Primary Examiner*—Samuel A. Acquah
(74) *Attorney, Agent, or Firm*—Novak Druce & Quigg LLP

(57) ABSTRACT

A process for preparing thermoplastic poly(3-hydroxyalkanoates) with a molar mass greater than 6 000 g/mol and a melting point in the range from 70 to 170° C., by reacting an oxirane compound with carbon monoxide in the presence of a transition metal catalyst which has rhodium(0), nickel(0), iron(0), cobalt(0) or palladium(0) as central metal and has been chelated with neutral Lewis bases, and also in the presence of diisocyanates, ortho esters, acetals, anhydrides, $P_2O_5$, MgO, $MgCl_2$, $MgSO_4$, zeolites, or a mixture of these, at a pressure in the range from 1 to 250 bar and at from room temperature to 150° C.

11 Claims, No Drawings

METHOD FOR THE PRODUCTION OF THERMOPLASTIC POLY(3-HYDROXYALKANOATES)

The present invention relates to a process for preparing thermoplastic poly(3-hydroxyalkanoates).

Poly-β-hydroxy fatty acids or poly(3-hydroxyalkanoates) are of major interest from ecological and economical points of view, since they are fully biodegradable polymers. A material particularly included here is polyhydroxybutyrolactone, which has a thermoplastic property profile if certain preconditions are met.

Polyhydroxybutyrolactones have hitherto been prepared commercially by fermentation (see also Y. Doi, Microbial Polyester, VCH Weinheim 1980, inter alia pp. 1–14; and product brochure for Biopol® from the company Zeneca Ltd., 1993). However, a complicated method is required if the resultant polymeric product is to be obtained in pure form from the fermentation mixture (Y. Doi, ibid., pp. 21 et seq.). For example, the cells first have to be broken apart before the polymeric crude product can be extracted. The resultant production costs cannot therefore at present compete with those for conventional thermoplastics. A further disadvantage is that polymer prepared by means of microorganisms is produced exclusively in highly isotactic form, giving it a high melting point, about 180° C., and, due to decomposition reactions, preventing its use for familiar plastics processing techniques, such as extrusion or injection molding. In addition, materials of this type are by their nature relatively rigid and brittle. The commercially available product Biopol® from the company Zeneca Ltd. therefore always contains at least small proportions of randomly distributed hydroxyvalerate units, besides the main constituent, which is hydroxybutyrate units. This was the only way of obtaining a sufficiently flexible and tough material (see also Y. Doi, ibid., pp. 107–133).

According to WO 94/00506 and WO 95/20616, poly-β-hydroxy-butyrolactone is also obtained starting from β-butyrolactone, via ring-opening polymerization. However, these reactions do not proceed stereospecifically, and they lead to atactic polymers which are viscous melts at room temperature and likewise cannot be used for familiar applications of polymeric materials. In any case, according to WO 94/00506 acceptable yields and molecular weights are obtained only if polymerization is carried out under conditions which are completely or almost completely anhydrous, requiring complicated drying measures for the apparatus and reagents used. The same applies to the process described in WO 95/20616, in which alkylzinc alkoxides are used as initiators instead of the carboxylate anions to be used according to WO 94/00506. In both of the abovementioned instances, enantiomerically pure β-butyrolactone has to be used as monomeric starting compound if the isotactic poly-β-butyrolactone obtained is to be capable of useful plastics processing. However, the synthetic route to these compounds, in particular for large-scale industrial applications, is highly complex and costly, and there are also high costs associated with purification (see also Seebach et al., Helv. Chim. Acta 1994, 77, pp. 1099–1123 and von Lengweiler, Helv. Chim. Acta 1996, 79, pp. 670–701, and also Breitschuh et al., Chimia 1990 (44), pp. 216–218, and Ohta et al., J.Chem.Soc., Chem. Commun. 1992, pp. 1725–1726).

(Partially) syndiotactic or (partially) isotactic poly-β-hydroxy-butyrolactone is also obtainable from R/S-β-butyrolactone via a stereospecific polymerization (see also Gross et al., Macromolecules 1988 (21), pp. 2657–2668; Krichel-dorf et al., Macromolecules 1994 (27), pp. 3139–3146). However, in this process it is again never possible completely to eliminate contamination of the product by atactic poly-β-hydroxybutyrolactone fractions, which require very complicated methods of removal from the polymerization mixture. Materials of this type cannot therefore be used in practical applications. Another disadvantage of the stereospecific polymerizations described is their long reaction time.

The stereospecific polymerization of butyrolactone may moreover proceed either with retention, with inversion, or with partial inversion (Hori et al., Macromolecules 1993 (26) pp. 5533–5534; Zhang et al., Polymer Preparation, 1989 (30) pp. 400–401; Jedlinski et al., Macromolecules 1998 (31) pp. 6718–6720; and Zhang et al. Macromolecules 1990 (23) pp. 3206–3212).

EP-A 0 577 206 describes the carbonylation of ethylene oxide with the aid of a catalyst system comprising $Co_2(CO)_8$ and a hydroxypyridine compound. The desired target product β-propiolactone was found to react to some extent to give poly-3-hydroxypropionate after a prolonged period, in particular in the presence of a promoter. This side reaction was not the subject of any further studies or further consideration, and no data at all are given concerning the molecular weight.

According to U.S. Pat. No. 3,590,075, polymeric compounds can be obtained from oxirane/carbon monoxide mixtures in the presence of metal salts of group VIII B of the Periodic Table of the Elements, and also of amines or alkanolamines, but these are not polyesters but polyether-esters, generally having high ether content, and moreover can be obtained only with molar masses in the region of 300 g/mol.

In order to gain access to (partially)syndiotactic or (partially)isotactic poly-β-hydroxybutyrolactone with high molecular weights, i.e. to a material whose property profile is useful for engineering applications, Lengweiler et al., ibid., developed a complicated multistage process which is, however, unsuitable for commercial applications, since it makes use of protective-group chemistry involving complicated preparative methods in order to obtain well-defined polymers with uniform molecular weight.

It is an object of the present invention, therefore, to provide a process which prepares poly(3-hydroxyalkanoates) with a thermoplastic property profile and which is simple and cost-effective to carry out, in particular on a large industrial scale, and which has no complicated purification or separation steps for starting materials and/or products, and which can readily utilize enantiomerically pure starting materials.

We have found that this object is achieved by means of a process for preparing thermoplastic poly(3-hydroxyalkanoates) with a molar mass greater than 6 000 g/mol, preferably greater than 8 000 g/mol, and in particular greater than 10 000 g/mol, and a melting point in the range from 70 to 170° C., preferably from 80 to 160° C., by reacting an oxirane compound with carbon monoxide in the presence of a transition metal catalyst which has rhodium(0), nickel(0), iron(0), cobalt(0) or palladium(0) as central metal and has been chelated with neutral Lewis bases, and also in the presence of diisocyanates, ortho esters, acetals, anhydrides, $P_2O_5$, MgO, $MgCl_2$, $MgSO_4$, zeolites, or a mixture of these, at a pressure in the range from 1 to 250 bar, preferably from 5 to 100 bar, and at from room temperature, i.e. about 25° C., to 150° C., preferably from 60 to 120° C.

Cobalt(0) compounds, such as octacarbonyldicobalt, are particularly suitable.

The amounts of the catalyst compound usually present in the polymerization mixture are from 0.001 to 20 mol %, preferably from 0.05 to 10 mol %, and particularly preferably from 0.1 to 1 mol %, based on the oxirane compound.

It is also possible to use metallic cobalt in very finely divided or dust form.

Although there is no intention to be bound to this interpretation, it is likely that the catalytically active species under the reaction conditions is what is known as a 16-electron cobalt compound, e.g. $HCo(CO)_3$ (see also S. G. Davies, Organotransition Metal Chemistry, Pergamon Press, Oxford, 1982, pp. 366 to 378).

Suitable oxirane compounds are ethylene oxide, and also epoxides substituted in the 1-position. These are usually compounds of the following formula (I):

(I)

where R is hydrogen, $C_1$–$C_{10}$-alkyl, $C_6$–$C_{14}$-aryl, or alkylaryl having from 1 to 10 carbon atoms in the alkyl moiety and from 6 to 14 carbon atoms in the aryl moiety.

$C_1$–$C_{10}$-Alkyl encompasses linear and also branched alkyl radicals, e.g. methyl, propyl, n-propyl, isopropyl, n-butyl, sec-butyl, tert-butyl, and also n-pentyl, n-hexyl, and branched-chain variants of these. Preferred alkyl radicals are methyl and ethyl, in particular methyl.

Suitable aryl radicals are the phenyl, naphthyl, and anthryl groups, preferably phenyl. A particular alkylaryl radical which may be used is the benzyl group.

The radicals described may moreover have mono- or polysubstitution by halogen atoms or by inert functional groups. For the purposes of the present invention, a functional group is inert if it does not enter into any reaction or initiate any side reaction under the reaction conditions of the invention. Examples of functional groups which may be used are the ester, ether, trifluoromethyl, nitro, and dimethylamino functionalities.

It is preferable to utilize oxirane compounds of the formula (I), where R is methyl, ethyl, n-propyl, n-butyl, or isobutyl, in particular methyl.

One of the significant factors for applications of thermoplastic aterials is that, if ethylene oxide is used as oxirane compound, the polyester obtained has sufficiently high molar mass above 6 000 g/mol, in particular above 8 000 g/mol. One of the significant factors for the purposes of the present invention is that the oxirane compound substituted in the 1-position is not used in the form of a racemate with respect to the stereocenter in the 1-position. Suitable oxirane compounds are therefore either enantiomerically pure or optically enriched with respect to the stereocenter in the 1-position, i.e. the R-1/S-1 ratio or S-1/R-1 ratio is not equal to 1. Preference is given to the use of R-1/S-1 ratios or S-1/R-1 ratios in the range from 1:4 to 1:200, particularly in the range from 1:8 to 1:70.

It is preferable to use oxiranes with enantiomeric purity in the range from 60 to 99% ee, particularly preferably from 65 to 99% ee, and in particular from 70 to 95% ee.

Particular preference is given to partially isotactic polyhydroxybutyrolactone obtained from optically enriched propene oxide.

Examples of the oxirane compounds to be used for the process of the invention are those obtained from terminal olefins by epoxidation reactions known to the skilled worker. If the epoxidation proceeds non-stereospecifically, the racemate has to be resolved. Methods of racemate resolution, e.g. by means of HPLC chromatography using chiral column material, are known to the skilled worker. It is advantageous to prepare the oxirane compound from a terminal olefin directly in enantiomerically pure or optically enriched form, via established stereoselective methods. An example of a suitable process is what is known as Sharpless epoxidation (see also J.Am.Chem.Soc. 1987 (109), pp. 5765 et seq. and 8120 et seq.; and also "Asymmetric Synthesis", ed. J. D. Morrison, Academic Press, New York, 1985, Vol. 5, chapter 7 and 8).

Optically enriched oxirane compounds can also be obtained from terminal olefins or from racemic terminal epoxides by processes described by Jacobsen et al. (Tetrahedron Lett. 1997, 38, pp. 773–776; and J. Org. Chem. 1998, 63, pp. 6776–6777). These processes are also simple to carry out on a large industrial scale (see also Acc. Chem. Res. 2000, 33, pp. 421–431).

It is, of course, also possible to prepare optically enriched oxirane compounds by adding an appropriate amount of racemate to the enantiomerically pure oxirane compound.

Compounds which may be used and have a terminal double bond are in principle any of the olefins in this class of compound, e.g. propene, 1-butene, 1-pentene, 1-hexene, 1-heptene, or 1-octene.

Suitable diisocyanate compounds are those of the formula $O{=}C{=}N{-}R^1{-}N{=}C{=}O$, where $R^1$ may be an aliphatic, alicyclic or aromatic radical. Suitable aliphatic radicals $R^1$ are methylene, 1,2-ethylene, 1,3-propylene, 1,4-butylene, isobutylene, 1,5-pentylene and 1,6-hexylene units. Suitable alicyclic radicals $R^1$ are cyclopentyl, cyclohexyl and cyclooctyl units, and suitable aromatic radicals $R^1$ are phenyl, naphthyl, anthracyl, and pyridyl units. It is preferable to utilize aromatic radicals $R^1$, such as the tolylene unit. Particularly suitable diisocyanate compounds which may be mentioned by way of example are tolylene diisocyanate, methylene-4,4'-di(phenyl isocyanate), and hexamethylene 1,6-diisocyanate. Diisocyanates are well known to the skilled worker, and an example of a description is found in Kirk-Othmer, Volume 21, pp. 56 to 106.

Suitable ortho esters are compounds of type $R^2{-}C(OR^3)_3$. $R^2$ and $R^3$ may be as defined for $R^1$, examples therefore being alkyl, aryl, and cycloalkyl. Particularly suitable ortho esters are those where $R^2$ is hydrogen, methyl, ethyl, n-propyl, isopropyl, n-butyl, isobutyl, tert-butyl or phenyl. Examples of radicals $R^3$ which may be used are methyl, ethyl, n-propyl, isopropyl, n-butyl, isobutyl, tert-butyl, cyclohexyl, phenyl, and benzyl. Preferred ortho esters are therefore trimethoxymethane, triethoxymethane, tripropoxymethane, triisopropoxymethane, 1,1,1-trimethoxyethane, 1,1,1-triethoxyethane, 1,1,1-trimethoxypropane, 1,1,1-triethoxy-propane, 1,1,1-trimethoxybutane, 1,1,1-trimethoxypentane, (trimethoxymethyl)benzene, and (triethoxymethyl)benzene.

For the purposes of the present invention, anhydrides are primarily carboxylic anhydrides. These are products of the coupling of two carboxylic acids of the formula $R^4C(O){-}O{-}C(O)R^5$. The radicals $R^4$ and $R^5$ may be as defined for $R^1$. Among the anhydrides, preference is given to the use of acetic, trifluoroacetic, propionic, glutaric, maleic, or succinic anhydride.

Acetals primarily include compounds of the formula $(R^6)(R^7)C(OR^8)(OR^9)$, where $R^6$ to $R^9$ may be as defined for $R^1$, and $R^6$ or $R^7$ may also be a hydrogen radical. $R^6$ and $R^7$ are preferably hydrogen, methyl, ethyl, n-propyl, isopropyl, n-butyl, sec-butyl, or tert-butyl, but $R^6$ and $R^7$ are not simultaneously a hydrogen radical. Among the acetals particular preference is given to 2,2'-dimethoxypropane.

Zeolites are aluminosilicates of alkali metals or of alkaline earth metals. Like the abovementioned diisocyanates, acetals, ortho esters, and anhydrides, this class of compounds is well known to the skilled worker and obtainable commercially.

In one preferred embodiment, the polymerization mixture also comprises hydroxyl-substituted N-aromatic systems. N-Aromatic systems which may be used are aromatic nitrogen heterocycles having one or more hydroxyl substituents. The N-aromatic systems have one, two or three nitrogen atoms in an aromatic ring system which preferably has 5 or 6 members. The nitrogen heterocycle may also be a constituent of an annelated aromatic ring system. Examples of suitable N-aromatic systems are therefore pyrrole, pyridine, quinoline, isoquinoline, pyrimidine, pyrazine and benzopyrazine, as long as these compounds have at least one free hydroxyl group in the molecule. Other N-aromatic systems which may be used are those annelated not with aromatic systems but with aliphatic ring systems having 5, 6 or 7 members. The location of the hydroxyl group may be either on the aromatic heterocycle or else on the annelated aliphatic aromatic ring system. Besides the hydroxyl group, the N-aromatic system may also have other aliphatic, aromatic, or halogen substituents.

Among the hydroxyl-substituted N-aromatic systems, particular preference is given to 2-hydroxy-, 3-hydroxy-, 4-hydroxy-, and 3,4-dihydroxypyridine, and also to 3-hydroxyquinoline, 4-hydroxy-2-methylpyridine, and 3-hydroxy-4-methylpyridine. 3-Hydroxypyridine is particularly preferred.

The amount of hydroxyl-substituted N-aromatic systems used is generally in the range from 0.1 to 10 equivalents, preferably in the range from 0.5 to 4 equivalents, based on the amount of cobalt compound used.

In another preferred embodiment, the polymerization mixture comprises hydroxyaromatic compounds alongside or instead of hydroxyl-substituted N-aromatic systems. Suitable hydroxyaromatic compounds are based on $C_6$–$C_{14}$ aromatic systems, such as phenyl, naphthyl or anthryl, in particular phenyl, with one or more hydroxyl groups as substituents. Phenol is particularly suitable. The amounts generally used of the hydroxyaromatic compounds are from 0.1 to 10 molar equivalents, preferably from 0.5 to 4 molar equivalents, based on the amount of cobalt compound.

The poly(3-hydroxyalkanoates) are prepared according to the process of the invention by reacting oxirane compounds and carbon monoxide in the presence of the catalyst compounds described, in particular cobalt or cobalt compounds, and of diisocyanates, ortho esters, acetals, anhydrides, $P_2O_5$, MgO, $MgCl_2$, $MgSO_4$, or zeolites, or a mixture of these.

There is generally also a solvent present, the amounts mostly being small, and its prime purpose is to introduce cobalt or cobalt compound and hydroxyl-substituted aromatic system and N-aromatic system into the polymerization vessel.

It is also possible to conduct the reaction with no solvent, as a gas-phase polymerization, by applying these catalyst components to a particulate support, e.g. silica or aluminum oxide.

Suitable solvents encompass in particular polar solvents, such as ether compounds, e.g. tetrahydrofuran, diethyl ether, dioxane, 2,5,8-trioxanone, anisole, and diethylene glycol dimethyl ether (diglyme), and also dimethylformamide and dimethyl sulfoxide. Protic solvents are less suitable, since they can lead to chain termination, for example, by ester formation.

The polymerization is usually carried out under superatmospheric pressure of carbon monoxide, up to 250 bar. However, polymer formation is also observed when the carbon monoxide pressure is one atmosphere. The carbon monoxide pressure used is preferably in the range from 2 to 200 bar, in particular in the range from 10 to 80 bar.

Suitable polymerization temperatures vary in the range from room temperature, i.e. about 25° C., to 150° C., and are preferably adjusted to values in the range from 35 to 90° C.

The polymerization according to the process of the invention may be carried out either batchwise or continuously.

The reaction is generally conducted by first combining cobalt compound and diisocyanate compound, acetal, anhydride, ortho ester, $P_2O_5$, MgO, $MgCl_2$, $MgSO_4$, or zeolite, and also, where appropriate, hydroxyl-substituted N-aromatic system, and/or hydroxyaromatic compound, either separately or in the reaction vessel, and where appropriate with cooling. The oxirane compound, too, may, where appropriate, be admixed with the solution/suspension of the catalyst components before these are transferred into the reaction vessel. It is also possible for the oxirane compound to be introduced directly into the reaction vessel. The polymerization is preferably carried out under inert conditions, i.e. in the absence of moisture and air.

Well-known processes may be used to terminate the polymerization and precipitate and work-up the products. For example, the polymer product may be isolated by adding low-molecular-weight alcohols, such as methanol, and isolate it in a simple manner by means of filtration.

The process of the invention can give isotactic poly(3-hydroxy-alkanoates) starting from enantiomerically pure oxirane compounds. If use is made of oxirane compounds in optically enriched form, partially isotactic polymers are obtained, the degree of optical purity corresponding directly to the degree of isotacticity achieved in the copolymer. In this way, and also using the molecular weight, it is possible for the thermoplastic property profile of this biodegradable class of polymer to be adjusted very simply and controllably for the applications desired.

The polymers obtained according to the process of the invention generally have molar masses $M_w$ (determined by gel permeation chromatography against a narrowly distributed polystyrene standard) greater than 6 000 g/mol, preferably greater than 8 000 g/mol, and particularly preferably greater than 10 000 g/mol. The polydispersities are generally below 1.7, preferably below 1.5, and particularly preferably below 1.4. The melting points of the polymers obtained are usually above 70° C., preferably above 80° C., particularly preferably above 90° C. The process of the invention can usually readily give conversions greater than 90%, and in particular even greater than 95%, and it is therefore unnecessary to purify the polymer product to remove unconverted monomer.

The polymers obtained according to the process of the invention can be processed by injection molding, blow molding, spinning, rotational molding, or extrusion. It is also possible to coat metallic, ceramic, or other surfaces, e.g. those made from plastics materials, wood, paper, or cellulose.

The polymers obtained are suitable for producing fibers, films, moldings, or coatings. They can also be used as blend components in plastics. Examples of suitable mixtures are obtained with polybutylene terephthalate or with the biodegradable polymer Ecoflex®, a copolymer made from adipic acid, butanediol and terephthalic acid. Details of the composition, structure and preparation of Ecoflex® are found in European Chemical News, 1995 (7), p. 36, for example.

The examples below give further illustration of the present invention.

EXAMPLES

Ethylene oxide was purchased from the company Merck, octacarbonyldicobalt from the company Fluka, and 3-hydroxypyridine and phenol from the company Aldrich, and each was used for the polymerization without further purification. Diglyme was purchased from the company Fluka (stored over molecular sieves) and degassed by means of ultrasound prior to each use.

The molecular weights were determined by means of gel permeation chromatography against a narrowly distributed polystyrene standard. The melting points were determined from DSC measurements.

Experimental

Example 1

3-Hydroxypyridine (760 mg) and 2,2'-dimethoxypropane (1.1 g) were added to $Co_2(CO)_8$ (684 mg) in diglyme (80 ml) at room temperature under an atmosphere of argon, and once mixing had taken place and the autoclave (270 ml) had been sealed, ethylene oxide (20 ml) was added. The carbon monoxide pressure was adjusted to 20 bar, and the reaction vessel heated to 80° C. and then the carbon monoxide pressure brought to 60 bar. After a reaction time of 1 hour, the polymerization was terminated by reducing the pressure to ambient pressure and pouring the reaction mixture into methanol (400 ml). The reaction mixture was filtered, and the solvent was removed from the filtrate. The resultant polymer was isolated, washed with methanol, filtered, and dried in vacuo. The yield of polymer was 8.84 g, and the molar mass $M_w$ was determined as 10 500 g/mol, and the polydispersity was 1.8.

Comparative Experiment

Example 2

The amounts and conditions used were kept exactly the same as in example 1 except for the sole difference that there was no addition of 2,2'-dimethoxypropane. The yield of polyester was 7.4 g, and the molar mass $M_w$ was determined as 5 100 g/mol, and the polydispersity was 1.7.

We claim:

1. A process for preparing thermoplastic poly(3-hydroxyalkanoates) with a molar mass $M_w$ greater than 6 000 g/mol and a melting point in the range from 70 to 170° C., by reacting an oxirane compound with carbon monoxide in the presence of a homogeneous transition metal catalyst which has rhodium(0), nickel(0), iron(0), cobalt(0) or palladium(0) as central metal and has been chelated with neutral Lewis bases, and also in the presence of ortho esters, acetals, carboxylic anhydrides, $P_2O_5$, or a mixture of these, at a pressure in the range from 1 to 250 bar and at from room temperature to 150° C.

2. A process as claimed in claim 1, where use is made of oxirane compounds which have monosubstitution in the 1-position.

3. A process as claimed in claim 1, where use is made of enantiomerically pure or optically enriched oxirane compounds.

4. A process as claimed in claim 1, where 2,2'-dimethoxypropane is used as acetal.

5. A process as claimed in claim 1, where the copolymerization is carried out in the presence of a hydroxyl-substituted N-aromatic system.

6. A process as claimed in claim 1, where the copolymerization is carried out in the presence of a hydroxyaromatic compound.

7. A process as claimed in claim 1, where use is made of an oxirane compound whose enantiomeric purity is in the range from 60 to 99% ee.

8. A process as claimed in claim 1, where propylene oxide is used as oxirane compound.

9. A process as claimed in claim 1, where $Co_2(CO)_8$ is used as catalyst compound.

10. A process as claimed in claim 1, wherein the poly(3-hydroxyalkanoates) have a molar mass $M_w$ greater than 8 000 g/mol.

11. The process claimed in claim 1, wherein the poly(3-hydroxyalkanoates) have a molar mass $M_w$ greater than 10 000 g/mol.

* * * * *